US011019092B2

(12) United States Patent
Satish et al.

(10) Patent No.: US 11,019,092 B2
(45) Date of Patent: May 25, 2021

(54) LEARNING BASED SECURITY THREAT CONTAINMENT

(71) Applicant: SPLUNK INC., San Francisco, CA (US)

(72) Inventors: Sourabh Satish, Fremont, CA (US); Oliver Friedrichs, Woodside, CA (US); Atif Mahadik, Fremont, CA (US); Govind Salinas, Sunnyvale, CA (US)

(73) Assignee: Splunk. Inc., San Francisco, CA (US)

( * ) Notice: Subject to any disclaimer, the term of this patent is extended or adjusted under 35 U.S.C. 154(b) by 0 days.

(21) Appl. No.: 14/677,493

(22) Filed: Apr. 2, 2015

(65) Prior Publication Data

US 2016/0164909 A1 Jun. 9, 2016

Related U.S. Application Data

(60) Provisional application No. 62/087,025, filed on Dec. 3, 2014, provisional application No. 62/106,830, filed on Jan. 23, 2015, provisional application No. 62/106,837, filed on Jan. 23, 2015.

(51) Int. Cl.
| | |
|---|---|
| *H04L 29/06* | (2006.01) |
| *G06F 21/55* | (2013.01) |
| *G06F 16/28* | (2019.01) |
| *H04L 12/851* | (2013.01) |

(52) U.S. Cl.
CPC ........ *H04L 63/1441* (2013.01); *G06F 16/285* (2019.01); *G06F 21/554* (2013.01); *H04L 63/0236* (2013.01); *H04L 63/1416* (2013.01); *H04L 63/1425* (2013.01);
(Continued)

(58) Field of Classification Search
CPC .......................... H04L 63/1441; G06F 21/554
See application file for complete search history.

(56) References Cited

U.S. PATENT DOCUMENTS

| | | |
|---|---|---|
| 6,405,318 B1 | 6/2002 | Rowland et al. |
| 7,076,803 B2 | 7/2006 | Bruton, III et al. |
| 7,127,743 B1 | 10/2006 | Khanolkar et al. |

(Continued)

OTHER PUBLICATIONS

Tejay, Gurvirender P.S.; Zadig, Sean M.; "Investigating the Effectiveness of IS Security Countermeasures Towards Cyber Attacker Deterrence", 45th Hawaii International Conference on System Sciences, IEEE, Jan. 4-7, 2012, pp. 3051-3060.*

(Continued)

*Primary Examiner* — Victor Lesniewski
(74) *Attorney, Agent, or Firm* — Nicholson De Vos Webster & Elliott LLP (57) ABSTRACT

Systems, methods, and software described herein provide action recommendations to administrators of a computing environment based on effectiveness of previously implemented actions. In one example, an advisement system identifies a security incident for an asset in the computing environment, and obtains enrichment information for the incident. Based on the enrichment information a rule set and associated recommended security actions are identified for the incident. Once the recommended security actions are identified, a subset of the action recommendations are organized based on previous action implementations in the computing environment, and the subset is provided to an administrator for selection.

19 Claims, 6 Drawing Sheets

(52) U.S. Cl.
CPC .......... *H04L 63/1433* (2013.01); *H04L 63/20* (2013.01); *H04L 47/2425* (2013.01)

(56) References Cited

U.S. PATENT DOCUMENTS

| | | | |
|---|---|---|---|
| 7,174,566 B2 | 2/2007 | Yadav et al. | |
| 7,469,301 B2 | 12/2008 | Daniell et al. | |
| 7,617,533 B1* | 11/2009 | Hernacki | H04L 63/1441 |
| | | | 726/22 |
| 7,900,259 B2 | 3/2011 | Jeschke et al. | |
| 7,950,056 B1 | 5/2011 | Satish et al. | |
| 8,042,171 B1 | 10/2011 | Nordstrom et al. | |
| 8,103,875 B1 | 1/2012 | Ramzan et al. | |
| 8,146,147 B2 | 3/2012 | Litvin et al. | |
| 8,185,953 B2 | 5/2012 | Rothstein et al. | |
| 8,261,317 B2 | 9/2012 | Litvin et al. | |
| 8,271,642 B1* | 9/2012 | Sankararaman | G06F 21/554 |
| | | | 709/224 |
| 8,291,495 B1 | 10/2012 | Burns et al. | |
| 8,380,828 B1* | 2/2013 | Schlichter | H04L 63/1441 |
| | | | 709/221 |
| 8,402,540 B2 | 3/2013 | Kapoor et al. | |
| 8,484,338 B2 | 7/2013 | Paster | |
| 8,516,575 B2 | 8/2013 | Burnside et al. | |
| 8,627,466 B2* | 1/2014 | Fisher | G06F 21/554 |
| | | | 726/22 |
| 8,676,970 B2 | 3/2014 | Boyns et al. | |
| 8,756,697 B2 | 6/2014 | Ocepek et al. | |
| 8,856,910 B1 | 10/2014 | Rostami-Hesarsorkh et al. | |
| 8,914,878 B2 | 12/2014 | Burns et al. | |
| 8,924,469 B2 | 12/2014 | Raleigh et al. | |
| 8,943,123 B2 | 1/2015 | Miyazaki et al. | |
| 8,949,931 B2 | 2/2015 | Ermagan et al. | |
| 8,955,107 B2 | 2/2015 | Eyada | |
| 9,009,814 B1 | 4/2015 | Wertz et al. | |
| 9,009,824 B1 | 4/2015 | Chen et al. | |
| 9,049,226 B1* | 6/2015 | Duane | H04L 63/1441 |
| 9,166,995 B1* | 10/2015 | Roundy | H04L 63/1441 |
| 9,231,964 B2 | 1/2016 | Cross et al. | |
| 9,256,739 B1 | 2/2016 | Roundy | G06F 21/554 |
| 9,306,965 B1* | 4/2016 | Grossman | H04L 63/1425 |
| 9,311,479 B1 | 4/2016 | Manni et al. | |
| 9,313,211 B1* | 4/2016 | Lototskiy | G06F 21/554 |
| 9,325,733 B1* | 4/2016 | Kolman | H04L 63/1416 |
| 9,336,385 B1* | 5/2016 | Spencer | G06F 21/56 |
| 9,338,181 B1* | 5/2016 | Burns | H04L 63/1433 |
| 9,344,445 B2 | 5/2016 | Burns et al. | |
| 9,378,361 B1 | 6/2016 | Yen et al. | |
| 9,396,592 B2 | 7/2016 | Chapman et al. | |
| 9,489,516 B1 | 11/2016 | Lu et al. | |
| 9,712,555 B2 | 7/2017 | Satish et al. | |
| 9,729,572 B1 | 8/2017 | Adams et al. | |
| 9,762,607 B2 | 9/2017 | Satish et al. | |
| 9,871,818 B2* | 1/2018 | Satish | H04L 63/1441 |
| 9,954,888 B2 | 4/2018 | Satish et al. | |
| 10,158,663 B2 | 12/2018 | Satish et al. | |
| 10,257,227 B1* | 4/2019 | Stickle | H04L 63/20 |
| 10,425,440 B2 | 9/2019 | Satish et al. | |
| 10,425,441 B2 | 9/2019 | Satish et al. | |
| 10,476,905 B2 | 11/2019 | Satish et al. | |
| 2004/0003286 A1* | 1/2004 | Kaler | G06F 21/554 |
| | | | 726/25 |
| 2004/0054498 A1 | 3/2004 | Shipp | |
| 2004/0111637 A1* | 6/2004 | Baffes | G06F 21/316 |
| | | | 726/23 |
| 2004/0250133 A1* | 12/2004 | Lim | G06F 21/554 |
| | | | 726/23 |
| 2005/0055578 A1 | 3/2005 | Wright et al. | |
| 2005/0235360 A1 | 10/2005 | Pearson | |
| 2006/0048209 A1* | 3/2006 | Shelest | G06F 21/554 |
| | | | 726/1 |
| 2006/0059568 A1* | 3/2006 | Smith-Mickelson | |
| | | | H04L 43/00 |
| | | | 726/27 |
| 2006/0095965 A1* | 5/2006 | Phillips | H04L 63/1441 |
| | | | 726/22 |
| 2006/0117386 A1 | 6/2006 | Gupta et al. | |
| 2006/0174342 A1* | 8/2006 | Zaheer | H04L 63/1441 |
| | | | 726/23 |
| 2007/0168874 A1 | 7/2007 | Kloeffer et al. | |
| 2008/0005782 A1 | 1/2008 | Aziz | |
| 2008/0082662 A1 | 4/2008 | Dandliker et al. | |
| 2008/0289028 A1 | 11/2008 | Jansen et al. | |
| 2009/0037548 A1 | 2/2009 | Ordille et al. | |
| 2010/0100962 A1* | 4/2010 | Boren | H04L 63/1433 |
| | | | 726/25 |
| 2010/0162347 A1 | 6/2010 | Barile | |
| 2010/0169973 A1 | 7/2010 | Kim et al. | |
| 2010/0251329 A1 | 9/2010 | Wei | |
| 2010/0319004 A1 | 12/2010 | Hudson | |
| 2010/0319069 A1* | 12/2010 | Granstedt | H04L 63/0263 |
| | | | 726/22 |
| 2010/0325412 A1* | 12/2010 | Norrman | G06Q 10/06 |
| | | | 713/100 |
| 2010/0325685 A1* | 12/2010 | Sanbower | G06F 21/554 |
| | | | 726/1 |
| 2011/0161452 A1* | 6/2011 | Poornachandran | |
| | | | H04W 12/1208 |
| | | | 709/207 |
| 2012/0210434 A1* | 8/2012 | Curtis | H04L 63/1441 |
| | | | 726/25 |
| 2012/0224057 A1* | 9/2012 | Gill | H04L 63/102 |
| | | | 348/143 |
| 2012/0331553 A1 | 12/2012 | Aziz et al. | |
| 2013/0007882 A1 | 1/2013 | Devarajan et al. | |
| 2013/0081141 A1* | 3/2013 | Anurag | G06F 21/55 |
| | | | 726/23 |
| 2013/0291106 A1* | 10/2013 | Simonoff | G06F 21/552 |
| | | | 726/23 |
| 2013/0312092 A1* | 11/2013 | Parker | H04L 63/1408 |
| | | | 726/22 |
| 2014/0082726 A1 | 3/2014 | Dreller et al. | |
| 2014/0089039 A1* | 3/2014 | McClellan | G06Q 10/0635 |
| | | | 705/7.28 |
| 2014/0137257 A1 | 5/2014 | Martinez et al. | |
| 2014/0165200 A1 | 6/2014 | Singla | |
| 2014/0165207 A1* | 6/2014 | Engel | H04L 63/1425 |
| | | | 726/25 |
| 2014/0199663 A1 | 7/2014 | Sadeh-Koniecpol et al. | |
| 2014/0237599 A1* | 8/2014 | Gertner | H04L 63/145 |
| | | | 726/24 |
| 2014/0259170 A1* | 9/2014 | Amsler | H04L 63/20 |
| | | | 726/23 |
| 2014/0310811 A1 | 10/2014 | Hentunen | |
| 2014/0344926 A1* | 11/2014 | Cunningham | H04L 63/1441 |
| | | | 726/22 |
| 2014/0351441 A1 | 11/2014 | Madani et al. | |
| 2014/0351940 A1* | 11/2014 | Loder | G06F 9/45558 |
| | | | 726/25 |
| 2015/0040217 A1 | 2/2015 | Abuelsaad et al. | |
| 2015/0215325 A1* | 7/2015 | Ogawa | G06F 17/30091 |
| | | | 726/23 |
| 2015/0222647 A1 | 8/2015 | Lietz et al. | |
| 2015/0304169 A1 | 10/2015 | Milman et al. | |
| 2015/0334132 A1 | 11/2015 | Zombik et al. | |
| 2015/0341384 A1 | 11/2015 | Mandayam et al. | |
| 2015/0347751 A1 | 12/2015 | Card et al. | |
| 2015/0365438 A1* | 12/2015 | Carver | H04L 63/1441 |
| | | | 726/1 |
| 2015/0381641 A1 | 12/2015 | Cabrera et al. | |
| 2015/0381649 A1* | 12/2015 | Schultz | G06Q 40/08 |
| | | | 726/25 |
| 2016/0006749 A1 | 1/2016 | Cohen et al. | |
| 2016/0065608 A1 | 3/2016 | Futty | |
| 2016/0072836 A1* | 3/2016 | Hadden | H04L 63/1441 |
| | | | 726/23 |
| 2016/0103992 A1* | 4/2016 | Roundy | G06F 21/554 |
| | | | 726/23 |
| 2016/0119379 A1 | 4/2016 | Nadkarni | |
| 2016/0164893 A1 | 6/2016 | Levi | |

(56) References Cited

U.S. PATENT DOCUMENTS

| | | | |
|---|---|---|---|
| 2016/0241580 A1* | 8/2016 | Watters | H04L 63/1433 |
| 2016/0241581 A1* | 8/2016 | Watters | H04L 63/1433 |
| 2017/0237762 A1* | 8/2017 | Ogawa | H04L 63/1425 |

OTHER PUBLICATIONS

Hasegawa, Hirokazu; Yamaguchi, Yukiko; Shimada, Hajime; Takakura; Hiroki; "A Countermeasure Recommendation System against Targeted Attacks with Preserving Continuity of Internal Networks", 38th Annual Computer Software and Applications Conference, IEEE, Jul. 21-25, 2014, pp. 400-405.*

Hershey, Paul C., Ph.D.; Silio, Jr., Charles B., Ph.D.; "Procedure for Detection of and Response to Distributed Denial of Service Cyber Attacks on Complex Enterprise Systems", International Systems Conference SysCon, IEEE, Mar. 19-22, 2012, 6 pages.*

Paudice, Andrea; Sarkar, Santonu; Cotroneo, Dominco; "An Experiment with Conceptual Clustering for the Analysis of Security Alerts", IEEE International Symposium on Software Reliability Engineering Workshops, Nov. 3-6, 2014, pp. 335-340.

Aguirre, Idoia; Alonso, Sergio: "Improving the Automation of Security Information Management: A Collaborative Approach", IEEE Security & Privacy, vol. 10, Issue 1, Oct. 25, 2011, pp. 55-59.

Abandonment from U.S. Appl. No. 14/675,075, mailed Feb. 8, 2017, 2 pages.

Advisory Action from U.S. Appl. No. 14/868,553, dated Jan. 24, 2019, 3 pages.

Final Office Action from U.S. Appl. No. 14/674,679, dated Sep. 22, 2016, 19 pages.

Final Office Action from U.S. Appl. No. 14/675,176, dated Nov. 25, 2016, 21 pages.

Final Office Action from U.S. Appl. No. 14/675,176, dated Sep. 25, 2017, 31 pages.

Final Office Action from U.S. Appl. No. 14/824,262, dated Apr. 6, 2017, 22 pages.

Final Office Action from U.S. Appl. No. 14/868,553, dated Oct. 15, 2018, 19 pages.

Final Office Action from U.S. Appl. No. 14/868,553, dated Oct. 18, 2017, 31 pages.

Final Office Action from U.S. Appl. No. 14/956,589, dated Nov. 22, 2017, 27 pages.

Final Office Action from U.S. Appl. No. 15/924,759, dated Aug. 1, 2018, 13 pages.

Non-Final Office Action from U.S. Appl. No. 16/107,972, dated Dec. 31, 2018, 11 pages.

Non-Final Office Action from U.S. Appl. No. 16/107,975, dated Jan. 4, 2019, 11 pages.

Non-Final Office Action from U.S. Appl. No. 16/107,979, dated Oct. 18, 2018, 14 pages.

Non-Final Office Action from U.S. Appl. No. 16/182,914, dated May 30, 2019, 23 pages.

Non-Final Office Action from U.S. Appl. No. 14/674,679, dated Jun. 2, 2016, 16 pages.

Non-Final Office Action from U.S. Appl. No. 14/675,075, dated Jul. 11, 2016, 13 pages.

Non-Final Office Action from U.S. Appl. No. 14/675,176, dated Apr. 17, 2017, 22 pages.

Non-Final Office Action from U.S. Appl. No. 14/675,176, dated Jul. 18, 2016, 18 pages.

Non-Final Office Action from U.S. Appl. No. 14/689,926, dated May 8, 2017, 34 pages.

Non-Final Office Action from U.S. Appl. No. 14/689,973, dated Jan. 25, 2017, 18 pages.

Non-Final Office Action from U.S. Appl. No. 14/824,262, dated Jul. 13, 2017, 20 pages.

Non-Final Office Action from U.S. Appl. No. 14/824,262, dated Oct. 7, 2016, 16 pages.

Non-Final Office Action from U.S. Appl. No. 14/868,553, dated Mar. 26, 2018, 22 pages.

Non-Final Office Action from U.S. Appl. No. 14/868,553, dated May 26, 2017, 45 pages.

Non-Final Office Action from U.S. Appl. No. 14/956,589, dated May 31, 2017, 33 pages.

Non-Final Office Action from U.S. Appl. No. 14/956,615, dated Jul. 28, 2017, 46 pages.

Non-Final Office Action from U.S. Appl. No. 15/699,454, dated Feb. 8, 2018, 19 pages.

Non-Final Office Action from U.S. Appl. No. 15/845,963, dated Feb. 12, 2018, 27 pages.

Non-Final Office Action from U.S. Appl. No. 15/886,183, dated Mar. 22, 2018, 21 pages.

Non-Final Office Action from U.S. Appl. No. 15/924,759, dated Feb. 26, 2019, 20 pages.

Non-Final Office Action from U.S. Appl. No. 16/142,913, dated Apr. 30, 2019, 33 pages.

Notice of Allowance from U.S. Appl. No. 16/107,972, dated May 9, 2019, 18 pages.

Notice of Allowance from U.S. Appl. No. 16/107,975, dated May 13, 2019, 18 pages.

Notice of Allowance from U.S. Appl. No. 14/674,679, dated Apr. 18, 2017, 20 pages.

Notice of Allowance from U.S. Appl. No. 14/674,679, dated Jun. 20, 2017, 5 pages.

Notice of Allowance from U.S. Appl. No. 14/674,679, dated May 12, 2017, 4 pages.

Notice of Allowance from U.S. Appl. No. 14/689,926, dated Dec. 20, 2017, 6 pages.

Notice of Allowance from U.S. Appl. No. 14/689,926, dated Nov. 8, 2017, 22 pages.

Notice of Allowance from U.S. Appl. No. 14/689,973, dated Aug. 10, 2017, 6 pages.

Notice of Allowance from U.S. Appl. No. 14/689,973, dated Jul. 27, 2017, 33 pages.

Notice of Allowance from U.S. Appl. No. 14/824,262, dated Jan. 5, 2018, 4 pages.

Notice of Allowance from U.S. Appl. No. 14/824,262, dated Nov. 22, 2017, 7 pages.

Notice of Allowance from U.S. Appl. No. 14/956,589, dated Apr. 23, 2018, 21 pages.

Notice of Allowance from U.S. Appl. No. 14/956,615, dated Dec. 18, 2017, 19 pages.

Notice of Allowance from U.S. Appl. No. 15/699,454, dated Aug. 9, 2018, 11 pages.

Notice of Allowance from U.S. Appl. No. 15/699,454, dated Nov. 20, 2018, 6 pages.

Notice of Allowance from U.S. Appl. No. 15/845,963, dated Jun. 26, 2018, 11 pages.

Notice of Allowance from U.S. Appl. No. 15/886,183, dated Sep. 19, 2018, 9 pages.

Final Office Action from U.S. Appl. No. 16/107,979, dated Jun. 13, 2019, 14 pages.

Final Office Action received for U.S. Appl. No. 16/182,914, dated Sep. 18, 2019, 6 pages.

Non-Final Office Action, U.S. Appl. No. 16/042,283, dated Jan. 24, 2020, 25 pages.

Non-Final Office Action, US App. No., dated Mar. 19, 2020, 18 pages.

Notice of Allowance from U.S. Appl. No. 15/924,759, dated Jun. 13, 2019, 21 pages.

Notice of Allowance from U.S. Appl. No. 16/142,913, dated Aug. 30, 2019, 21 pages.

Notice of Allowance received for U.S. Appl. No. 16/107,979, dated Oct. 7, 2019, 14 pages.

Notice of Allowance, U.S. Appl. No. 14/675,176, dated Dec. 30, 2019, 6 pages.

Notice of Allowance, U.S. Appl. No. 16/182,914, dated Dec. 4, 2019, 5 pages.

Final Office Action, U.S. Appl. No. 16/568,949, dated Oct. 28, 2020, 19 pages.

Non-Final Office Action, U.S. Appl. No. 14/675,176, dated Jul. 14, 2020, 18 pages.

(56) References Cited

OTHER PUBLICATIONS

Non-Final Office Action, U.S. Appl. No. 16/539,918, dated Jul. 16, 2020, 14 pages.
Non-Final Office Action, U.S. Appl. No. 16/736,120, dated Sep. 22, 2020, 14 pages.
Notice of Allowance, U.S. Appl. No. 14/868,553, dated Jun. 26, 2020, 8 pages.
Notice of Allowance, U.S. Appl. No. 16/042,283, dated Jul. 28, 2020, 17 pages.

* cited by examiner

LEARNING BASED SECURITY THREAT CONTAINMENT

RELATED APPLICATIONS

This application is related to and claims priority to U.S. Provisional Patent Application No. 62/087,025, entitled "ACTION RECOMMENDATIONS FOR COMPUTING ASSETS BASED ON ENRICHMENT INFORMATION," filed on Dec. 3, 2014, U.S. Provisional Patent Application No. 62/106,830, entitled "ACTION RECOMMENDATIONS FOR ADMINISTRATORS IN A COMPUTING ENVIRONMENT," filed on Jan. 23, 2015, and U.S. Provisional Patent Application No. 62/106,837, entitled "SECURITY ACTIONS IN A COMPUTING ENVIRONMENT," filed on Jan. 23, 2015, and which are hereby incorporated by reference in their entirety.

TECHNICAL FIELD

Aspects of the disclosure are related to computing environment security, and in particular to implementing security actions in a computing environment based on previously implemented actions.

TECHNICAL BACKGROUND

An increasing number of data security threats exist in the modern computerized society. These threats may include viruses or other malware that attacks the local computer of the end user, or sophisticated cyber attacks to gather data and other information from the cloud or server based infrastructure. This server based infrastructure includes real and virtual computing devices that are used to provide a variety of services to user computing systems, such as data storage, cloud processing, web sites and services, amongst other possible services. To protect applications and services, various antivirus, encryption, and firewall implementations may be used across an array of operating systems, such as Linux and Microsoft Windows.

Further, some computing environments may implement security information and event management (SIEM) systems and other security detection systems to provide real-time analysis of security alerts generated by network hardware and applications. In particular, SIEM systems allow for real-time monitoring, correlation of events, notifications, and console views for end users. Further, SIEM systems may provide storage logs capable of managing historical information about various security events within the network. Although SIEMs and other security identifying systems may generate security alerts for devices within the network, administrators may be forced to translate each of these alerts into particular actions. Thus, time and resources that could be used on other tasks may be used in researching and determining an appropriate course of action to handle a security threat.

Overview

The technology disclosed herein enhances how security action recommendations are provided to administrators of a computing environment. In one example, an advisement system is configured to identify a security incident within a computing environment. In response to the incident, the advisement system obtains enrichment information for the incident, and determines a rule set based on the enrichment information. Once the rule set is determined, recommended actions are identified based on the rule set, which are then organized based on the effectiveness of previous actions that have been implemented in the environment. Upon being organized, the organized set of actions may be provided to an administrator for selection and implementations within the environment.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

The various examples disclosed herein provide for using the effectiveness of previously implemented security actions in suggesting new security actions. In many situations, organizations may employ a variety of computing assets, which may include various hardware and processes. During the operation of the hardware and process, security incidents may occur, which inhibit the operation of the assets and the environment as a whole. In some implementations, security monitoring systems, such as security information and event management (SIEM) systems or local security process on each computing element, may identify a security incident.

In response to identifying the security incident, information about the incident may be transferred or passed to an advisement system to determine a course of action to take against the security incident. In at least one example, responsive to identifying a security incident, the advisement system may obtain enrichment information about the incident from internal and external sources. These sources may include websites, databases, or other similar sources that maintain information about various threats that could be present within the organizations computing assets. For example, an unknown process may be identified as a security incident for a computing asset. In response to identifying the unknown process, the advisement system may query a database to determine if the unknown process is malicious.

Once the enrichment information is obtained with regards to the incident, the advisement system may identify a rule set for the incident based on the enrichment information, and determine a set of action recommendations based on the rule set. These action recommendations may include a variety of procedures that eliminate, segregate, monitor or provide other similar actions on the identified threat. For example, if the enrichment information indicated that an unknown process was malicious, the action suggestions that are identified for the incident may include segregating the affected computing asset from other computing assets in the environment, removing files and other objects from the affected computing asset related to the malicious process, further monitoring the actions of the malicious process, or other similar operations that are directed at the malicious process.

Here, once the rule set and action recommendations are determined, the advisement system may further organize the action recommendations based on the effectiveness of previously implemented actions within the environment. For example, if a virus was identified within a first computing system and a first action was taken against the virus, then the effectiveness of the first action against the virus could be used against a second identification of the virus. This effectiveness may be measured on whether the virus is still active on the first computing system, whether the virus has spread to other computing systems, or any other similar measure of effectiveness that may be monitored by the advisement system. If the first action were not effective against the virus, the action recommendations for the second identification of the virus may be reordered to avoid selection of the same action, the action recommendations may remove actions that were taken for the first instance of the virus, or other similar actions to prevent a similar action selection. In contrast, if the first action were effective against the virus, the organization of the action recommendations may further promote the first action by placing the action as a higher ranking in a list of suggested actions, removing other action recommendations that are different from the first action, or some other similar processes to further promote the first action.

In some implementations, although actions may not be identical, actions against similar threats may be used to organize the recommendations that are provided to the administrator. These similar threats may include similar viruses, similar attacks by an outside internet protocol (IP) address, or some other similar threat determination. Based on actions that were taken against the similar threat, an organized set of action recommendations may be provided to an administrator. In some examples, an administrator or some other personnel member may define threats as similar, and store the similar threats in a searchable data structure accessible when a new threat is identified. However, in addition to or in place of manually defining similar threats, one or more machine learning algorithms may be implemented that can compare information for various threats and define threats as similar.

Once action recommendations are provided to an administrator, either through user interface on the administration system or an external console device, the administrator may select and action to be implemented against the incident. In response to the user selection, the administrator may be provided with a workflow to implement the necessary processes for the action, such as implementing firewall rules, removing files or directories associated with malicious software, setting up a virtual private area network (VLAN), and the like. In the alternative, the advisement system may include or have access to the necessary automated procedures to implement the necessary action. Accordingly, although the network may include a variety of different devices and software, the advisement system may include the necessary procedures to implement the action in the different software and hardware configurations.

Figure 1:
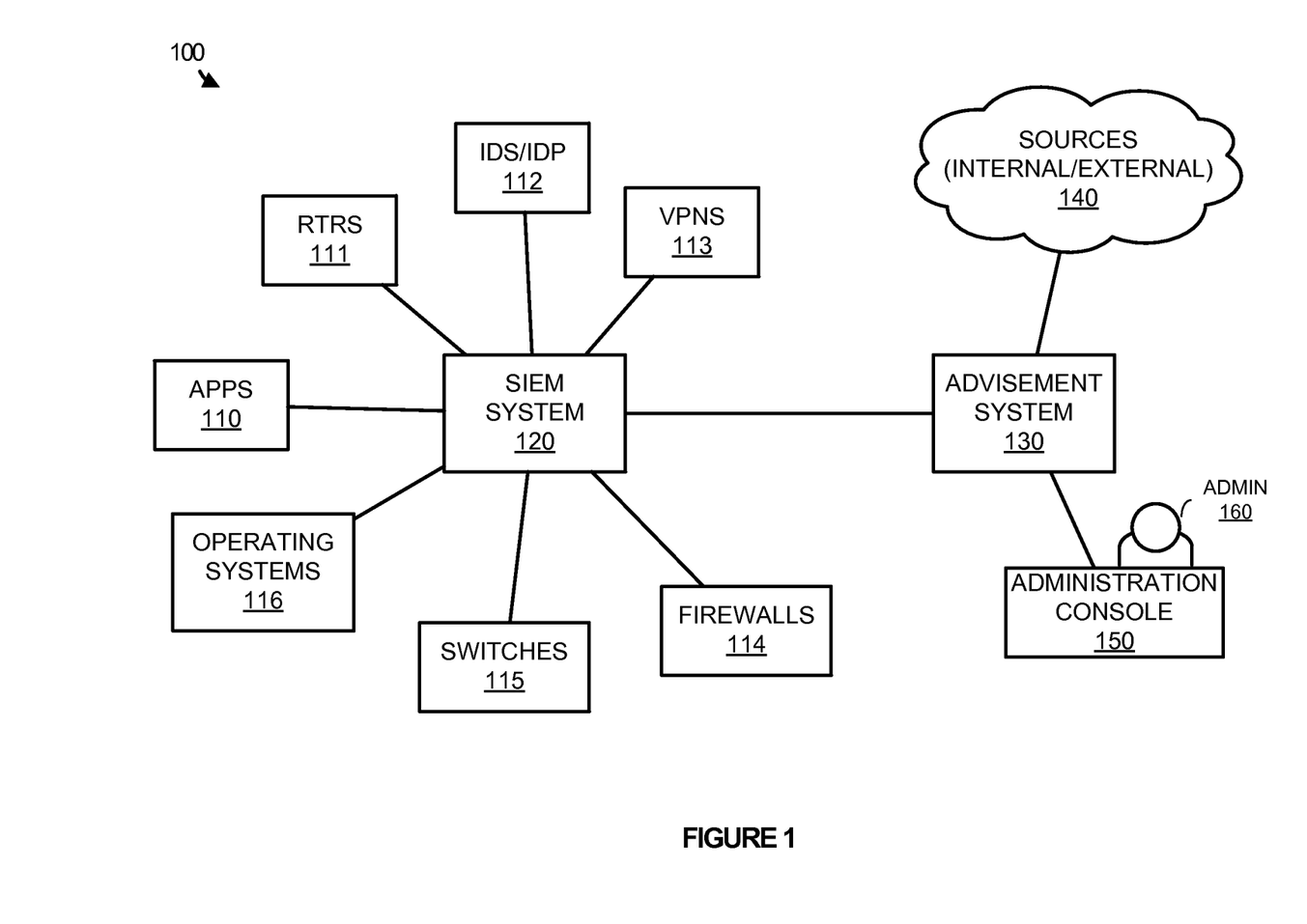
FIG. 1 illustrates a computing environment to manage security actions for a plurality of network assets.

To further illustrate the operation of an advisement system within a computing network, FIG. 1 is provided. FIG. 1 illustrates a computing environment 100 to manage security actions for a plurality of network assets. Computing environment 100 includes computing assets 110-116, SIEM system 120, advisement system 130, sources 140, and administration console 150. Computing assets 110-116 include applications 110, routers 111, intrusion detection systems and intrusion prevention system (IDS/IDP) 112, virtual private networks (VPNs) 113, firewalls 114, switches 115, and operating systems 116, although other assets may exist. Assets 110-116 may execute via any number of computing systems or devices. In addition to the routers and switches, these computing devices may include server computers, desktop computers, laptop computers, tablet computers, and the like. Although not illustrated in the present example, in some implementations, assets may be defined at computing system level. Accordingly, assets may be defined as physical computing systems, such as servers, end user computing systems, host computing systems, and the like, and may further be defined as virtual computing systems, such as virtual machines executing via host computing systems. These physical and virtual computing systems may include an operating system, applications, processes, firewalls, and other similar computing resources.

SIEM system 120, advisement system 130, internal and external sources 140, and administration console 150 may each include communication interfaces, network interfaces, processing systems, computer systems, microprocessors, storage systems, storage media, or some other processing devices or software systems, and can be distributed among multiple devices. SIEM system 120, advisement system 130, and sources 140 may comprise one or more server, desktop, laptop, or other similar computing devices. Administration console 150 may comprise an end user device, such as a desktop computer, laptop computer, smartphone, tablet, or any other similar computing device.

Advisement system 130 communicates with SIEM system 120, sources 140, and administration console 150 via communication links that may use Time Division Multiplex (TDM), asynchronous transfer mode (ATM), internet protocol (IP), Ethernet, synchronous optical networking (SONET), hybrid fiber-coax (HFC), circuit-switched communication signaling, wireless communications, or some other communication format, including combinations and improvements thereof. Similarly, SIEM system 120 may gather information from assets 110-116 via a plurality of communication links to the computing systems associated with the assets, wherein the links may use TDM, ATM, IP, Ethernet, SONET, HFC, circuit-switched communication signaling, wireless communications, or some other communication format, including combinations and improvements thereof. While not illustrated in the present example, it should be understood that advisement system 130 might communicate with the assets over various communication links and communication formats to implement desired security actions, or to receive an incident report.

In operation, SIEM system 120 receives data and performance information from assets 110-116 and performs inspections to identify possible security issues. Once SIEM system 120 identifies a possible security threat, information about the security threat is transferred to advisement system 130. Advisement system 130 identifies the security threat and analyzes the threat using sources 140 to determine suggested actions against the security threat. Once the suggested actions are determined, the actions are transferred, via email, text message, or other similar format, to administration console 150 to be presented to administrator 160.

Figure 2:
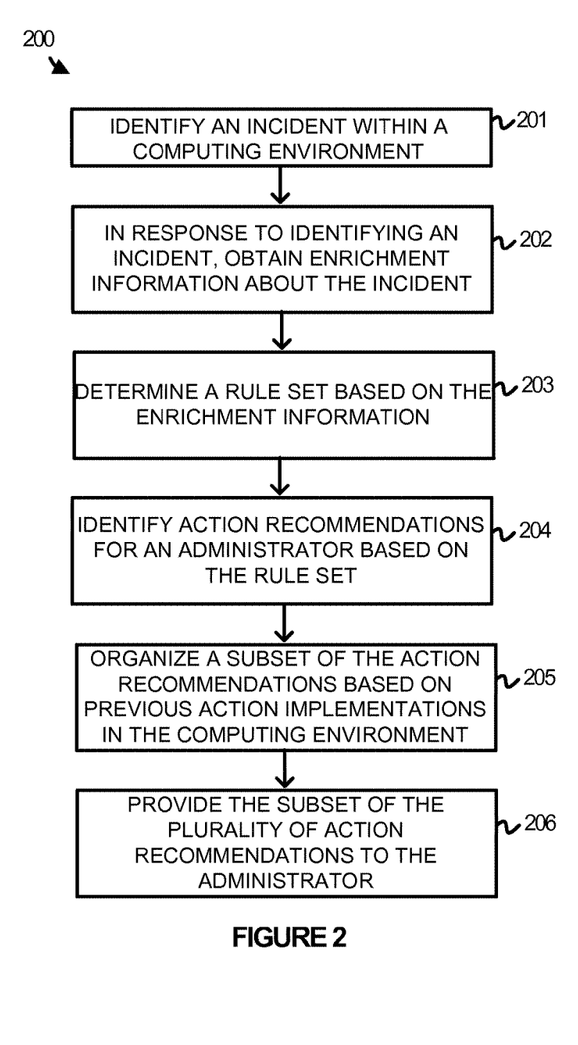
FIG. 2 illustrates a method of operating an advisement system to provide action recommendations for a plurality of network assets.

To further illustrate the operation of computing environment 100, FIG. 2 is provided. FIG. 2 illustrates a method 200 of operating advisement system 130 to provide action recommendations for a plurality of network assets. In particular, as described in FIG. 1, SIEM system 120 receives information from a plurality of network assets 110-116 and identifies security threats based on the information. Once a threat is identified, the threat is transferred to advisement system 130. Advisement system 130 identifies the security threat or incident within computing environment 100 (201), and in response to identifying the incident, gathers enrichment information about the incident (202). Specifically, advisement system 130 may identify properties or traits of the incident, such as the internet protocol (IP) address for the incident, the firewall associated with the incident, the computing device for the incident, the host, the user, any uniform resource locators (URLs) associated with the incident, or any other threat information specific to the security incident. Once the properties are identified, advisement system 130 may identify information related to the threat using internal and external sources 140. These sources may include databases or websites that keep track of malicious IP addresses or domain names, the type of threats presented from the particular domain names, identifies of malware, Trojans, and viruses, amongst a variety of other information.

Upon determining enrichment information related to a particular incident, advisement system 130 may determine a rule set based on the enrichment information (203). This rule set is related to the type of threat presented to the network and computing environment 100. For example, enrichment information may indicate that an unknown process within the environment is a malicious and presents a threat to the data and devices within the organization. Once the rule set is determined, advisement system 130 identifies action recommendations for an administrator based on the rule set (204). In some implementations, the rule sets identified by the advisement system may be associated with particular action recommendations that eliminate, segregate, monitor, or provide other similar actions on the identified threat.

Here, once action recommendations are identified, advisement system 130 organizes at least a subset of the action recommendations based on previous action implementations in the computing environment (205). For example, if the same threat had been identified in the environment previously, advisement system 130 may identify how effective previous actions were in handling the threat. This effectiveness may be measured on how much of the threat remained in the environment, how much the threat had spread to other assets in the environment, how much data was lost after the implementation of the action, or any other similar effectiveness measurement.

After the action recommendations are organized based on effectiveness, advisement system 130 may provide the subset of the plurality of action recommendations to an administrator (206). In some implementations, advisement system 130 may include a user interface for presenting the action recommendations. However, in other instances as illustrated in the environment of FIG. 1, advisement system 130 may transfer or provide the action recommendations to administration console 150 to be presented to the administrator.

In some implementations, in organizing the subset of the action recommendations, advisement system 130 may rank the various possible action recommendations for the administrator. By ranking the action recommendations or placing the recommendations within a hierarchy, the user may select an action based on what advisement system 130 would suggest to be implemented for the action. For example, if malware were identified in a first computing system of the environment, but previously selected actions did not remove the malware from the affected computing systems. Advisement system 130 may demote or remove the previous actions in the next suggestions to the administrator, directing the administrator to select a new action.

Referring to FIG. 1 as an example, a firewall in firewalls 114 may encounter a security issue that is identified by advisement system 130. In response to identifying the issue, advisement system 130 may obtain enrichment information from sources 140 to identify a rule set and related set of action recommendations to be supplied to administrator 160. Once the action recommendations are determined, advisement system 130 may organize at least a subset of the action recommendations to be supplied to administrator 160 based on the effectiveness of previously implemented actions. For example, if an unknown IP address were attacking firewall 114, advisement system 130 may identify previous actions that were taken against the same unknown IP address to determine how effective the actions were against the threat. Once the subset of actions is organized, the actions may be provided to an administrator, allowing the administrator to select an action against the threat.

Although illustrated in FIG. 1 with a SIEM system, it should be understood that in some examples other systems, such as the assets themselves within the computing environment, might be used to identify security threats. Further, although illustrated separate in the example of FIG. 1, it should be understood that SIEM system 120 might reside wholly or partially on the same computing systems as advisement system 130.

Figure 3:
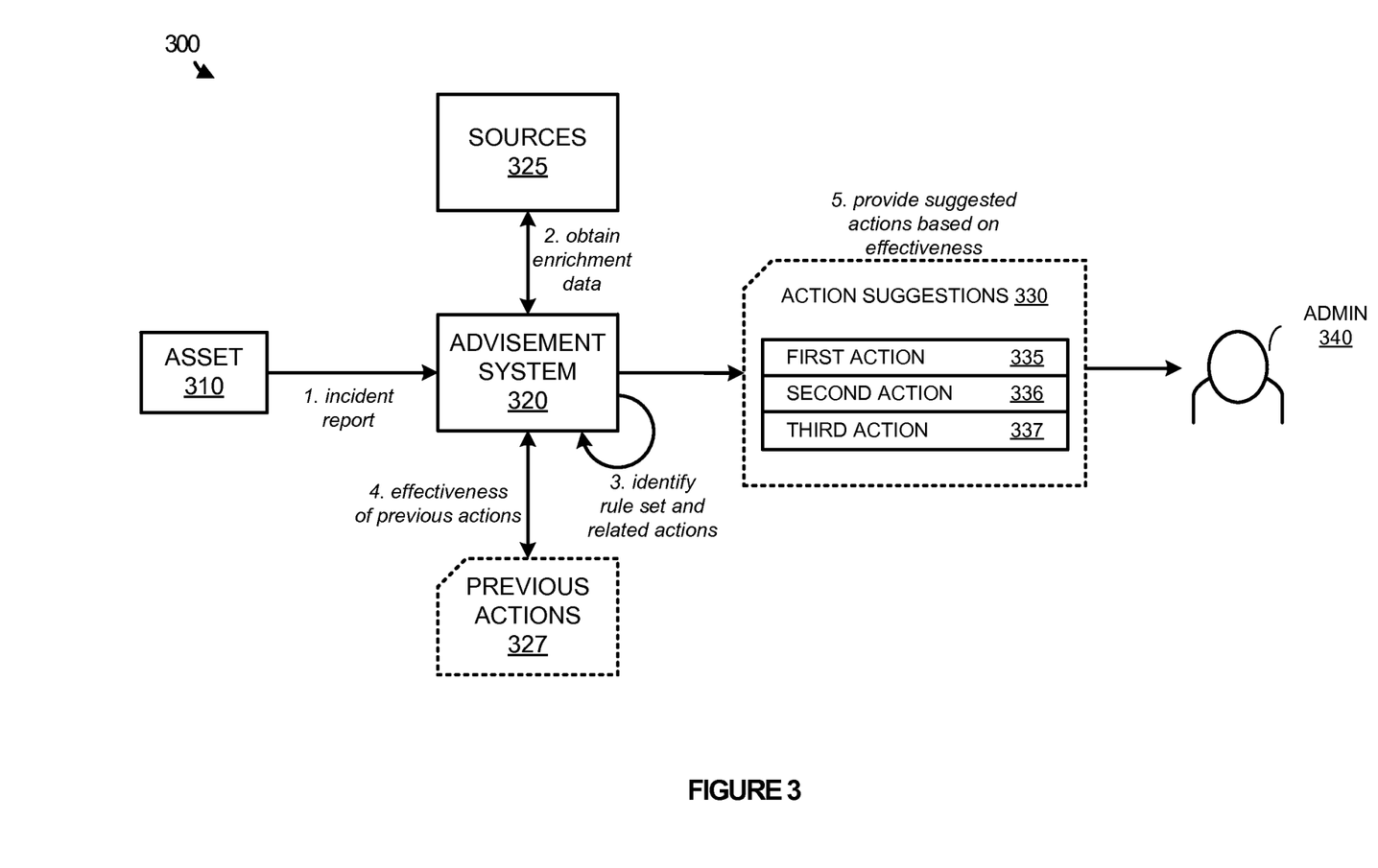
FIG. 3 illustrates an operational scenario of identifying security actions according to one example.

Turning to FIG. 3, FIG. 3 illustrates an operational scenario 300 of identifying security actions according to one example. Operational scenario 300 includes asset 310, advisement system 320, sources 325, previous actions 327, action suggestions 330, and administrator 340. As described herein assets may comprise operating systems, virtual machines, application files, routers, switches, firewalls, or any other similar asset. Further, in some examples, assets may be defined as an entire computing system, such as a server or personal computing system, which includes an operating system, files, applications, and processes.

As described herein, security systems and processes, such as SIEM systems, are configured to identify possible security incidents within a computing environment that includes a plurality of computing systems and assets. Here, asset 310 is identified with a security incident, and a report of the incident is transferred to advisement system 320. This incident report may be generated by an agent that is collocated on the same computing system or device as asset 310, or may be generated by an external system such as a SIEM that reports the incident to advisement system 320.

In response to the incident, advisement system 320 obtains enrichment data from sources 325, which may comprise databases, webpages, or other resources that store information about security threats. For example, a database may be maintained that includes recently identified malware applications. Accordingly, if the incident report indicated an unknown application executing on an asset, the unknown application may be compared to the identified malware applications of the database to determine a rule set for the unknown application. In some implementations, to manage the various rule sets for the advisement system, one or more data structures may be accessible by the advisement system that relates rule sets to asset types and enrichment information about the incident. For example, an incident may be reported for an unknown process executing on a virtual machine asset. Once enrichment information is gathered about the unknown process, the advisement system may identify a rule set that applies to virtual machines, unknown processes, and the enrichment information determined about the unknown process. Accordingly, an unknown process that is known to be malicious from the enrichment information may be associated with a different rule set than an unknown process that cannot be confirmed to be malicious.

Upon determining the rule set for the security incident, advisement system 320 identifies security actions based on or associated with the rule set for the security incident. Once the action recommendations are determined, advisement system 320 uses previous actions 327 to determine the effectiveness of previous actions against the same or similar threat. For example, if advisement system 320 had previously implemented actions against a piece of malware, the effectiveness of these previous actions against the malware may be used to organize action suggestions when the malware is identified on another asset. Similarly, even if the new malware were not identical to previously identified malware, the enrichment information obtained from sources 325 may indicate similarities between the malware. Accordingly, advisement system 320 may use similar malware threats and actions to organize the new subset of action recommendations or suggestions to be provided to administrator 340.

Here, action suggestions 330 include actions 335-337, which are selectable by the user either on an administration console or on advisement system 320. In some implementations, actions 335-337 are ranked in a hierarchy based on the likely effectiveness within the environment. As a result, in the example of FIG. 3, first action 335 is the action that advisement system 320 identifies as most likely to limit or mitigate the effects of the incident. In contrast, third action 337 is the action that advisement system 320 identifies as the least likely to limit or mitigate the effects of the incident. In some implementations, the ranking of the actions may be modified based on previous actions 327. In other examples, one or more actions may be eliminated as options to be supplied to the administrator based on their effectiveness on previous incidents.

Figure 4:
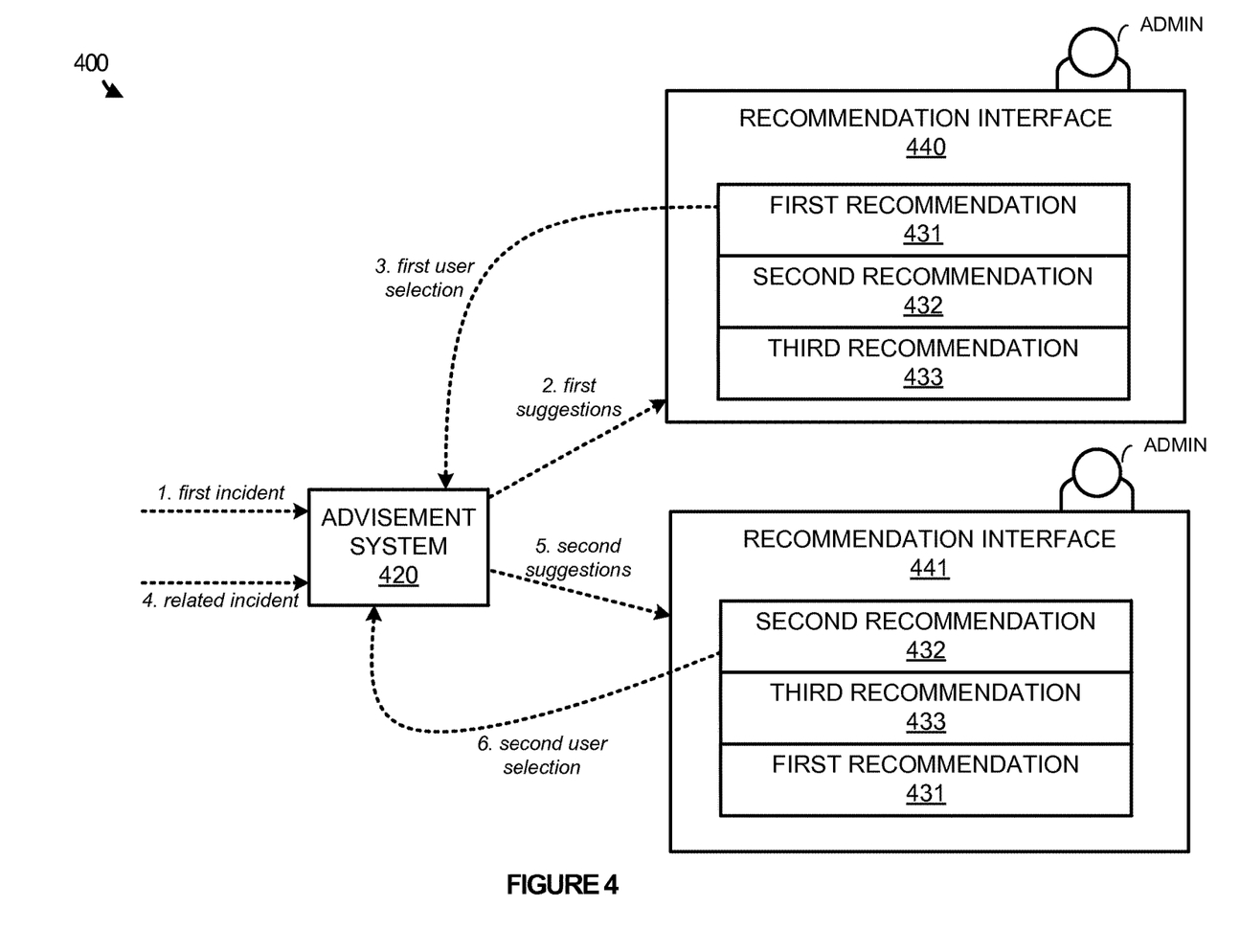
FIG. 4 illustrates an overview of providing action recommendations to an administrator based on previously implemented actions.

Referring now to FIG. 4, FIG. 4 illustrates an overview 400 of providing action recommendations to an administrator based on previously implemented actions. Overview 400 includes advisement system 420 and recommendation interfaces 440-441. Recommendation interfaces 440-441 further include recommendations 431-433. Recommendation interfaces 440-441 may be displayed at an administration console, such as a desktop computer, laptop computer, tablet, and the like, or may be displayed locally on advisement system 420. Advisement system 420 may include one or more devices capable of identifying security incidents within a computing environment, and providing action recommendations to counter the issues.

As illustrated, advisement system 420 identifies a first incident for a first computing asset within the computing environment. This notification of a security incident may come from a SIEM system, another security element within the network, or the computing asset itself. Responsive to identifying the incident, advisement system 420 obtains enrichment information for the incident and identifies a rule set for the incident. Based on the rule set, advisement system 420 provides first action suggestions to an administrator via recommendation interface 440, wherein the action suggestions rank first recommendation 431 as the best selection option, and third recommendation 433 as the worst selectable option.

Once the recommendations are provided to the administrator, the administrator may make a first action selection, in this example, first recommendation 431. In response to the selection, advisement system 420 may initiate a process to implement the selected action within the computing environment. In some implementations, advisement system 420 may provide a workflow, which directs the administrator with the necessary steps and processes to implement the desired action within the environment. In other implementations, advisement system 420 may be configured with the necessary procedures and process to at least partially implement the desired action. Accordingly, even though an environment may include devices from a variety of manufacturers and software from a variety of distributors, advisement system 420 may include procedures that allow the advisement system to identify the manufacturer or distributor and implement the desired action within the environment. For example, if an action included a modification to a firewall, advisement system 420 may identify the type of firewall, and implement the necessary procedures to make the modification to the firewall. These procedures may include logging into the associated device, and implementing the necessary scripts to make the desired changes.

Once the first user-selected action is implemented within the environment, advisement system 420 may identify a second security incident within the environment. In response to the second security incident, advisement system 420 may obtain enrichment information for the incident, and determine a rule set based on the enrichment information. In the present example, the second incident identified by advisement system 420 is related to the first incident. This related incident may be the same as the previous incident, such as the same piece of malware as the first incident, or may be a similar incident to the first incident based on the enrichment information. For example, an unknown process may be identified for the second incident, but the enrichment information for the unknown process may indicate that the process is similar to the process of the first incident.

Once a rule set is determined for the related incident, advisement system 420 identifies the effectiveness of previous actions within the environment. In particular, because advisement system 420 implemented first recommendation 431, advisement system 420 may determine the effectiveness of first recommendation 431. This effectiveness measurement may be based on whether the threat was eliminated in the environment, whether the threat was contained in the environment, or any other similar effectiveness measurement. Here, advisement system 420 determines the first recommendation was effective against the incident. Accordingly, in organizing the recommendations to the administrator, advisement system 420 lowers the ranking of first recommendation 431 to third, and improves the ranking of recommendations 432-433, as illustrated in recommendation interface 441.

Once the recommendations are made available to the administrator, the administrator may select a recommendation to be implemented in the environment. Upon implementation, the selection may be used in determining and organizing future recommendations to administrators.

Although illustrated in the example of FIG. 4 as lowering the ranking of an ineffective recommendation, it should be understood that in some instances the ineffective action might be removed from the list of selectable actions. In particular, first recommendation 431 may be removed as a selection for the administrator if it were ineffective against one or more related incidents. Further, although illustrated as allowing the administrator to select a single action, it should be understood that the administrator might select multiple actions to provide the appropriate response to a security incident.

Figure 5:
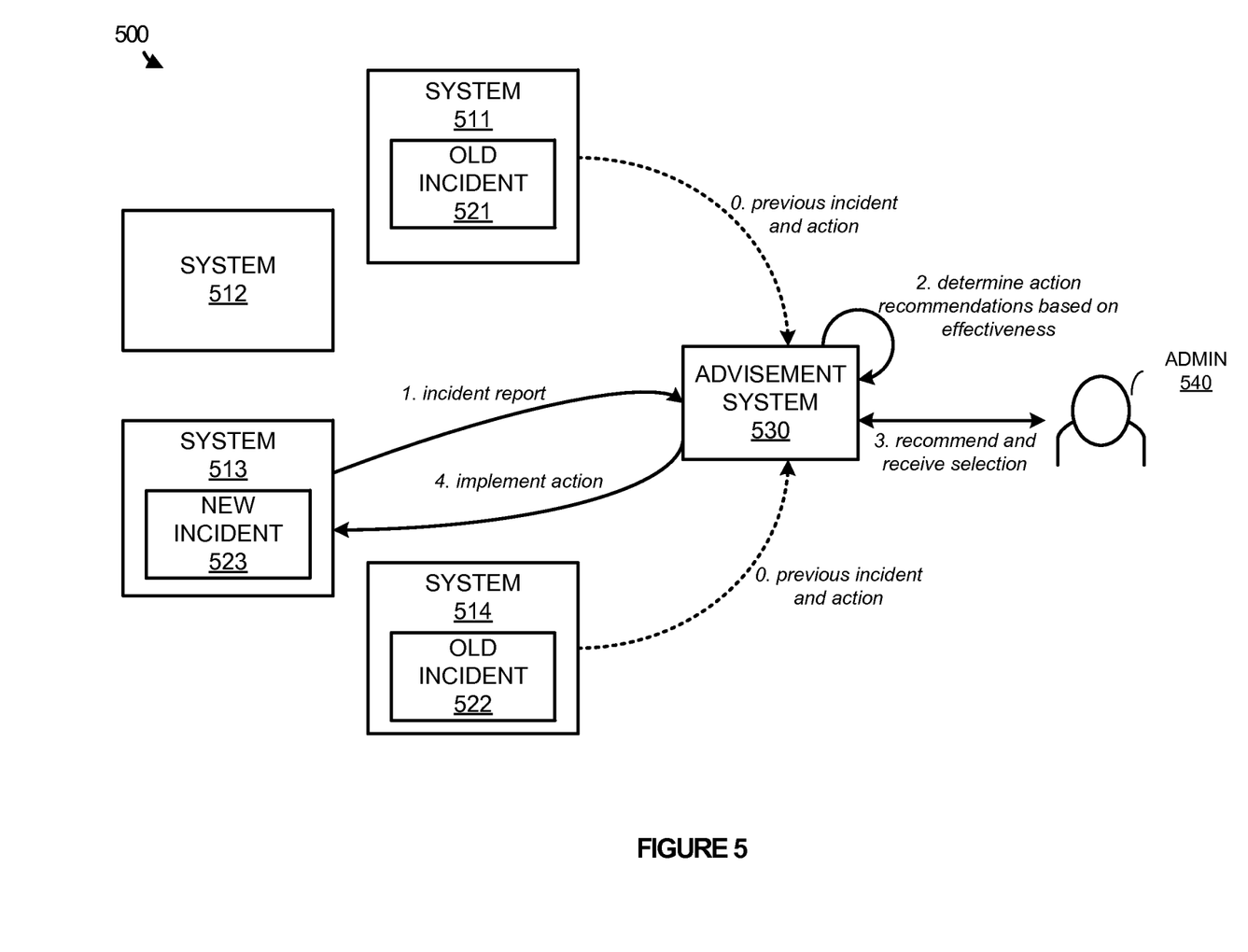
FIG. 5 illustrates a computing environment to recommend and implement security actions based on the effectiveness of previous actions.

To further demonstrate the implementation of actions within a computing environment, FIG. 5 is provided. FIG. 5 illustrates a computing environment 500 to recommend and implement security actions based on the effectiveness of previous actions. Computing environment 500 includes computing systems 511-514 advisement system 530 and administrator 540. Computing systems 511-514 are examples of computing assets in an organization and may be representative of a physical or virtual machine for the organization. Advisement system 530 may comprise one or more computing devices capable of recommending and implementing security actions for computing environment 500.

As illustrated, advisement system 530 identifies and implements actions against old incidents 521-522 that are identified within the computing environment. These actions may include default actions that are identified based on the enrichment information and a rule set for the incident, or may include user defined actions that were implemented based on user selected actions. Once actions are taken against old incidents 521-522, advisement system 530 may identify new incident 523 in system 513 that is related to old incidents 521-522. For example, new incident 523 may comprise a process or executable that is related to old incidents 521-522.

In response to identifying the incident, advisement system 530 determines a set of action recommendations to prescribe for the incident based at least one the effectiveness of actions against related incidents. In one implementation, advisement system 530 may gather enrichment information for new incident 523, and determine a rule set based on the enrichment information. Once the rule set is determined, advisement system 530 may organize a subset of recommended actions to provide to administrator 540 based on the rule set and the effectiveness of the actions in the environment. For example, if the actions implemented for old incidents 521-522 were effective, then advisement system 530 may promote the use of the same actions for new incident 523. In contrast, if the actions used for old incidents 521-522 were not effective, the advisement system 530 may promote other actions that could be more effective against the incident.

Once the actions suggestions are identified, advisement system 530 may provide the actions to administrator 540. In some implementations, the actions may be provided as a list, where the highest recommended action appears first, and the remaining actions appear in descending order. However, it should be understood that the actions might be presented in any way that organizes the actions from highly recommended to least recommended. Once the actions are provided to the administrator, the administrator may select one of the actions to be implemented for new incident 523.

In some implementations, the administrator may be guided via a workflow to implement the desired action. This workflow may include directions to processes that are required to implement the desired action. For example, the workflow could direct the administrator to log into the necessary computing device and implement the necessary software changes. In an alternative implementation, advisement system 530 may include connectors or preconfigured implementation processes for computing systems and software within the environment. Consequently, even if the environment included a variety of different computing systems and software, advisement system 530 may identify the systems software that require the change and implement the necessary modifications to the systems and software.

Figure 6:
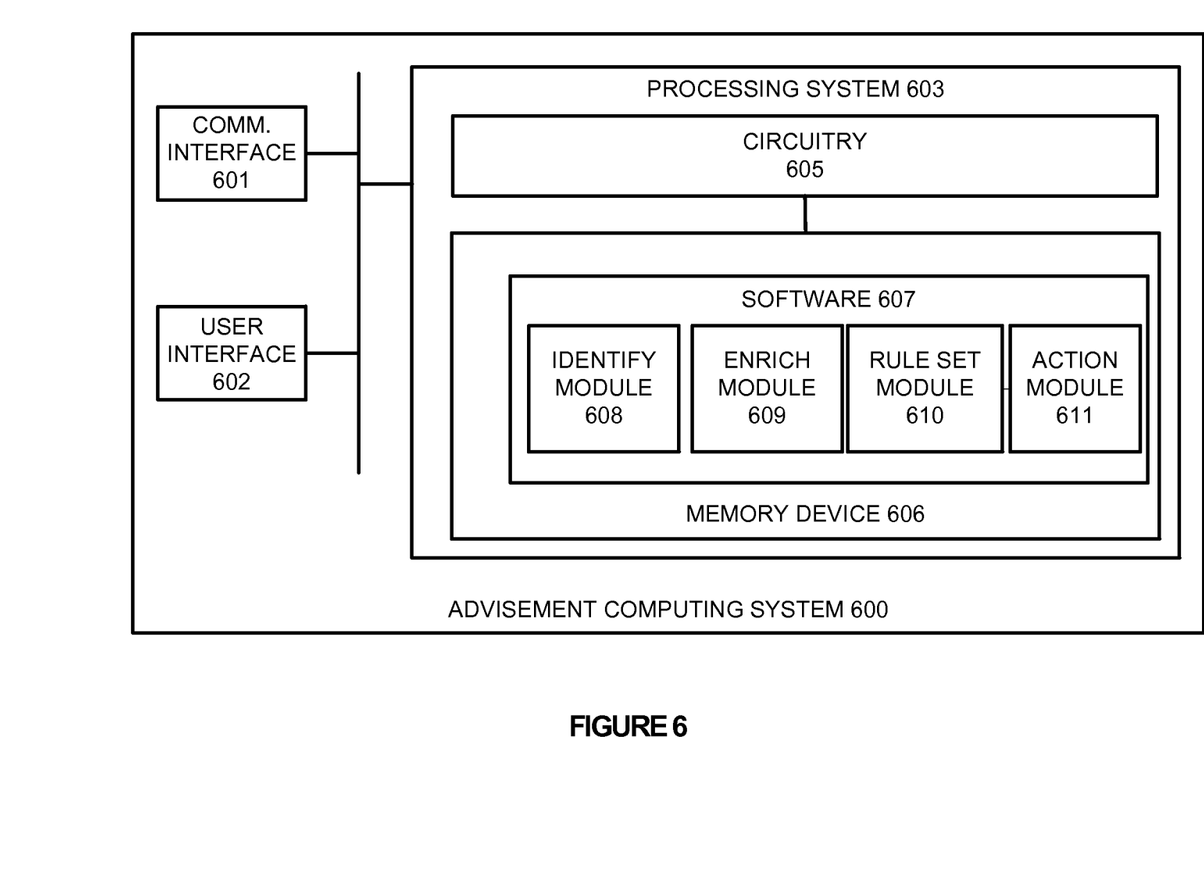
FIG. 6 illustrates an advisement computing system to provide action recommendations for a plurality of network assets.

FIG. 6 illustrates an advisement computing system 600 to provide action recommendations for a plurality of network assets. Advisement computing system 600 is representative of a computing system that may be employed in any computing apparatus, system, or device, or collections thereof, to suitably implement the advisement systems described herein. Computing system 600 comprises communication interface 601, user interface 602, and processing system 603. Processing system 603 is communicatively linked to communication interface 601 and user interface 602. Processing system 603 includes processing circuitry 605 and memory device 606 that stores operating software 607.

Communication interface 601 comprises components that communicate over communication links, such as network cards, ports, radio frequency (RF) transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof. In particular, communication interface 601 may communicate with security identification systems, such as SIEM systems, security systems on the assets themselves, or some other security identification system. Further, communication interface 601 may be configured to communicate with one or more administration consoles to provide the suggested actions to administrators, and the computing assets of the environment to implement selected actions.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes identify module 608, enrichment module 609, rule set module 610, and suggest module 611, although any number of software modules may provide the same operation. Operating software 607 may further include an operating system, utilities, drivers, network interfaces, applications, or some other type of software. When executed by circuitry 605, operating software 607 directs processing system 603 to operate advisement computing system 600 as described herein.

In particular, identify module 608 is configured to, when executed by advisement computing system 600 and processing system 603, to identify a security incident for an asset within the computing environment. Once identified via a SIEM system or other security-monitoring module, enrichment module 609 identifies enrichment information for the security incident. This enrichment information may be gathered from sources internal to the computing environment, as well as external sources, such as websites and databases. For example, if an asset within the computing environment was connecting in an abnormal way to a particular IP address, enrichment module 609 may contact one or more sources to determine information about the unknown IP address. These sources may include information about whether the address is malicious, whether the address belongs to a particular entity, or any other similar information regarding the IP address.

Once the enrichment information is determined, rule set module 610 may identify a rule set based at least one the enrichment information about the incident. However, a rule set may also be identified based on the type of asset affected by the incident, the criticality of the asset affected by the incident, or some other similar rule set identification criteria. Upon determining the rule set, action module 611 directs processing system 603 to identify a set of actions that could be recommended for the incident, and further organizes at least a subset of the actions to be provided to an administrator based on the effectiveness of previously implemented actions. For example, if the same or a similar incident were previously identified within the environment, computing system 600 may identify the effectiveness of actions that were taken against the incidents to determine if they should be recommended for the current incident.

In some implementations, the identification of related incidents and action may occur internal to the organization. Thus, computing system 600 may use actions that were taken for computing assets within the environment. However, in other examples, computing system 600 may access a database or another similar system that includes effectiveness information for actions in other computing environments. For example, a first organization may encounter an incident and take a particular action against the incident. When the same incident is identified within an asset associated with computing system 600, computing system 600 may identify the effectiveness of the action in the first organization in determining the action recommendations that will be supplied to the administrator.

Once the action recommendations are determined, advisement computing system 600 may provide the action recommendations to the administrator. In some examples, the action recommendations may be provided to the user via user interface 602. In other implementations, communication interface 601 may be used to transfer the action recommendations for display to the administrator on a console device.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer-implemented method performed by an advisement system, the method comprising:
   receiving an indication of a security incident involving a computing asset in a networked computing environment comprising a plurality of computing assets;
   in response to receiving the indication of the security incident, obtaining enrichment information about the security incident from one or more internet resources;
   identifying, based on the enrichment information, a plurality of action recommendations for responding to the security incident;
   identifying, for each action recommendation of the plurality of action recommendations, an effectiveness measurement indicating an effectiveness of the action recommendation against past occurrences of the security incident, wherein the effectiveness measurement of an action recommendation of the plurality of action recommendations against past occurrences of the security incident is generated by measuring an amount of data lost after execution of the action recommendation;
   identifying a subset of action recommendations from the plurality of action recommendations based on a respective effectiveness measurement of each action recommendation of the plurality of action recommendations, wherein the subset of action recommendations is less than the plurality of action recommendations;
   receiving input selecting an action recommendation from the subset of action recommendations; and
   implementing the action recommendation in the networked computing environment.

2. The method of claim 1, wherein identifying the effectiveness measurement indicating an effectiveness of the action recommendation against past occurrences of the security incident includes measuring an effectiveness of an instance of a user selecting the action recommendation.

3. The method of claim 1, wherein identifying the effectiveness measurement indicating an effectiveness of the action recommendation against past occurrences of the security incident includes measuring an effectiveness of an automatic implementation of the action recommendation.

4. The method of claim 1, wherein the indication of the security incident comprises at least one of: an internet protocol (IP) address related to the security incident, an identity of the computing asset affected by the security incident, or a process name related to the security incident.

5. The method of claim 4, wherein the one or more internet resources includes a database or a website associated with the security incident.

6. The method of claim 1, further comprising providing a hierarchy of the subset of action recommendations to a user via an administration console of the advisement system.

7. The method of claim 1, further comprising causing display of a user interface including a representation of a hierarchy of the subset of action recommendations.

8. The method of claim 1, wherein the effectiveness measurement is further generated by measuring whether the action recommendation removed threats associated with the security incident.

9. A non-transitory computer readable storage medium having instructions stored thereon which, when executed by one more processors, cause performance of operations comprising:
   receiving an indication of a security incident involving a computing asset in a networked computing environment comprising a plurality of computing assets;
   in response to receiving the indication of the security incident, obtaining enrichment information about the security incident from one or more internet resources;
   identifying, based on the enrichment information, a plurality of action recommendations for responding to the security incident;
   identifying, for each action recommendation of the plurality of action recommendations, an effectiveness measurement indicating an effectiveness of the action recommendation against past occurrences of the security incident, wherein the effectiveness measurement of an action recommendation of the plurality of action recommendations against past occurrences of the security incident is generated by measuring an amount of data lost after execution of the action recommendation;
   identifying a subset of action recommendations from the plurality of action recommendations based on a respective effectiveness measurement of each action recommendation of the plurality of action recommendations, wherein the subset of action recommendations is less than the plurality of action recommendations;

receiving input selecting an action recommendation from the subset of action recommendations; and implementing the action recommendation in the networked computing environment.

10. The non-transitory computer readable storage medium of claim 9, wherein identifying the effectiveness measurement indicating an effectiveness of the action recommendation against past occurrences of the security incident includes measuring an effectiveness of an instance of a user selecting the action recommendation.

11. The non-transitory computer readable storage medium of claim 9, wherein identifying the effectiveness measurement indicating an effectiveness of the action recommendation against past occurrences of the security incident includes measuring an effectiveness of an automatic implementation of the action recommendation.

12. The non-transitory computer readable storage medium of claim 9, wherein the indication of the security incident comprises at least one of: an internet protocol (IP) address related to the security incident, an identity of the computing asset affected by the security incident, or a process name related to the security incident.

13. The non-transitory computer readable storage medium of claim 12, wherein of the one or more internet resources includes a database or a website associated with the security incident.

14. The non-transitory computer readable storage medium of claim 9, further comprising providing a hierarchy of the subset of action recommendations to a user via an administration console of an advisement system.

15. The non-transitory computer readable storage medium of claim 9, further comprising causing display of a user interface including a representation of a hierarchy of the subset of action recommendations.

16. The non-transitory computer readable storage medium of claim 9, wherein the effectiveness measurement is further generated by measuring whether the action recommendation removed threats associated with the security incident.

17. An apparatus, comprising:
one or more processors;
one or more non-transitory computer readable storage media storing instructions which, when executed by the one or more processors, cause the apparatus to:
receive an indication of a security incident involving a computing asset in a networked computing environment comprising a plurality of computing assets;
in response to receiving the indication of the security incident, obtaining enrichment information about the security incident from one or more internet resources;
identify, based on the enrichment information, a plurality of action recommendations for responding to the security incident;
identify, for each action recommendation of the plurality of action recommendations, an effectiveness measurement indicating an effectiveness of the action recommendation against past occurrences of the security incident, wherein the effectiveness measurement of an action recommendation of the plurality of action recommendations against past occurrences of the security incident is generated by measuring an amount of data lost after execution of the action recommendation;
identify a subset of action recommendations from the plurality of action recommendations based on a respective effectiveness measurement of each action recommendation of the plurality of action recommendations, wherein the subset of action recommendations is less than the plurality of action recommendations;
receive input selecting an action recommendation from the subset of action recommendations; and
implement the action recommendation in the networked computing environment.

18. The apparatus of claim 17, wherein the effectiveness measurement is further generated by measuring whether the action recommendation removed threats associated with the security incident.

19. The apparatus of claim 17, wherein the instructions, when executed by the one or more processors, further cause the apparatus to cause display of a user interface including a representation of a hierarchy of the subset of action recommendations.

\* \* \* \* \*